US007484307B2

(12) United States Patent
Abrecht

(10) Patent No.: US 7,484,307 B2
(45) Date of Patent: Feb. 3, 2009

(54) LEVEL WITH UNINTERRUPTED MARKING SURFACE WITH HIGH-VISIBILITY CENTER VIAL

(75) Inventor: Rachel Abrecht, Farmington, CT (US)

(73) Assignee: The Stanley Works, New Britain, CT (US)

( * ) Notice: Subject to any disclaimer, the term of this patent is extended or adjusted under 35 U.S.C. 154(b) by 117 days.

(21) Appl. No.: 11/581,001

(22) Filed: Oct. 16, 2006

(65) Prior Publication Data

US 2008/0086901 A1 Apr. 17, 2008

(51) Int. Cl.
*G01C 9/24* (2006.01)
*G01C 9/32* (2006.01)

(52) U.S. Cl. .............................. 33/451; 33/348; 33/379

(58) Field of Classification Search .................. 33/348, 33/354, 365, 377, 379, 381, 382, 383, 384, 33/389, 390, 451; D10/69
See application file for complete search history.

(56) References Cited

U.S. PATENT DOCUMENTS 1,055,878 A * 3/1913 Colbath ........................ 33/348
1,510,495 A 10/1924 Gurley
2,576,202 A 11/1951 Wullschleger ............... 33/211
3,009,254 A * 11/1961 Youngs ....................... 33/379
3,863,346 A 2/1975 Quenot .......................... 33/88
4,011,660 A 3/1977 Johnson ....................... 33/379
4,208,803 A * 6/1980 Brown et al. .................. 33/348
4,255,865 A 3/1981 Levene ........................ 33/336
4,476,635 A 10/1984 Hart ............................ 33/228
6,427,993 B1 8/2002 Prochac ....................... 269/37
6,568,095 B2 * 5/2003 Snyder ........................ 33/370
6,675,490 B1 1/2004 Krehel et al. ................. 33/382
6,901,681 B2 6/2005 Bueno ......................... 33/647
2001/0013175 A1 * 8/2001 Gruetzmacher et al. ....... 33/382
2002/0066774 A1 6/2002 Prochac ...................... 228/212
2003/0101611 A1 6/2003 Bueno ......................... 33/647
2005/0223578 A1 10/2005 Scarborough ................ 33/451
2006/0123644 A1 6/2006 Szumer et al. ................ 33/374

FOREIGN PATENT DOCUMENTS

CH 239981 A 7/1945
DE 3 327 556 2/1985
FR 2 322 354 3/1977
GB 2 303 461 A 2/1997
GB 2 394 772 A 5/2004
WO WO 9305361 A1 * 3/1993
WO WO 2006/121547 A1 11/2006
WO WO 2007128992 A1 * 11/2007

OTHER PUBLICATIONS

United Kingdom Search Report issued for United Kingdom Patent Application No. GB0718864.2, dated Jan. 7, 2008.

* cited by examiner

*Primary Examiner*—R. A. Smith
(74) *Attorney, Agent, or Firm*—Pillsbury Winthrop Shaw Pittman LLP

(57) ABSTRACT

A level is provided that includes a body comprising upper and lower parallel walls and first and second side walls operatively connected with the upper and lower walls. The upper wall has first and second linear edges extending longitudinally along opposite sides and an opening therethrough. The first of the side walls has an opening therethrough such that the opening in the upper wall and the opening in the first side wall are contiguous with one another. The first linear edge is disposed at the operative connection between the upper wall and the second side wall and extends uninterruptedly from end to end of the body. A bubble vial is disposed in the body and is visible through the opening in the upper wall and through the opening in the first side wall.

19 Claims, 5 Drawing Sheets

10 11 12 14 16 20 22 24 26 28 31 32 34 36 38 46 48 58 60 62 64 66 68 70 72 A A'

32
70
58
22
14
64
20
68
30
12
18
31
28
62
24
52
72
66
44
60
50
42
10
40
32

LEVEL WITH UNINTERRUPTED MARKING SURFACE WITH HIGH-VISIBILITY CENTER VIAL

FIELD OF THE INVENTION

The present invention relates to levels and, more particularly, to levels with an uninterrupted marking surface.

BACKGROUND OF THE INVENTION

Two conflicting needs regarding level vials (bubble vials) in levels generally pertain to visibility and the need to protect the vials against impact. Conventional "open center-vial" levels address the visibility concern by cutting away extruded material along the top surface of the level body that surrounds the vial. The disruption in the top surface of these devices, however, makes it difficult to use the entire top surface of the level as a marking surface or straightedge. Further, the bubble vials in these devices may be vulnerable to breakage by impact due to their wide exposure area.

SUMMARY OF THE INVENTION

In accordance with an embodiment of the present invention, a level is provided that includes a body comprising upper and lower parallel walls and first and second side walls operatively connected with the upper and lower walls. The upper wall has first and second linear edges extending longitudinally along opposite sides and an opening therethrough. The first of the side walls has an opening therethrough such that the opening in the upper wall and the opening in the first side wall are contiguous with one another. The first linear edge is disposed at the operative connection between the upper wall and the second side wall and extends uninterruptedly from end to end of the body. A bubble vial is disposed in the body and is visible through the opening in the upper wall and through the opening in the first side wall.

Other objects, features, and advantages of the present invention will become apparent from the following detailed description, the accompanying drawings, and the appended claims.

BRIEF DESCRIPTION OF THE DRAWINGS

The above-mentioned and other features and advantages of the present invention, and the manner of attaining them, will become more apparent and the disclosure itself will be better understood by reference to the following description taken in conjunction with the accompanying drawings, wherein.

Figure 1:
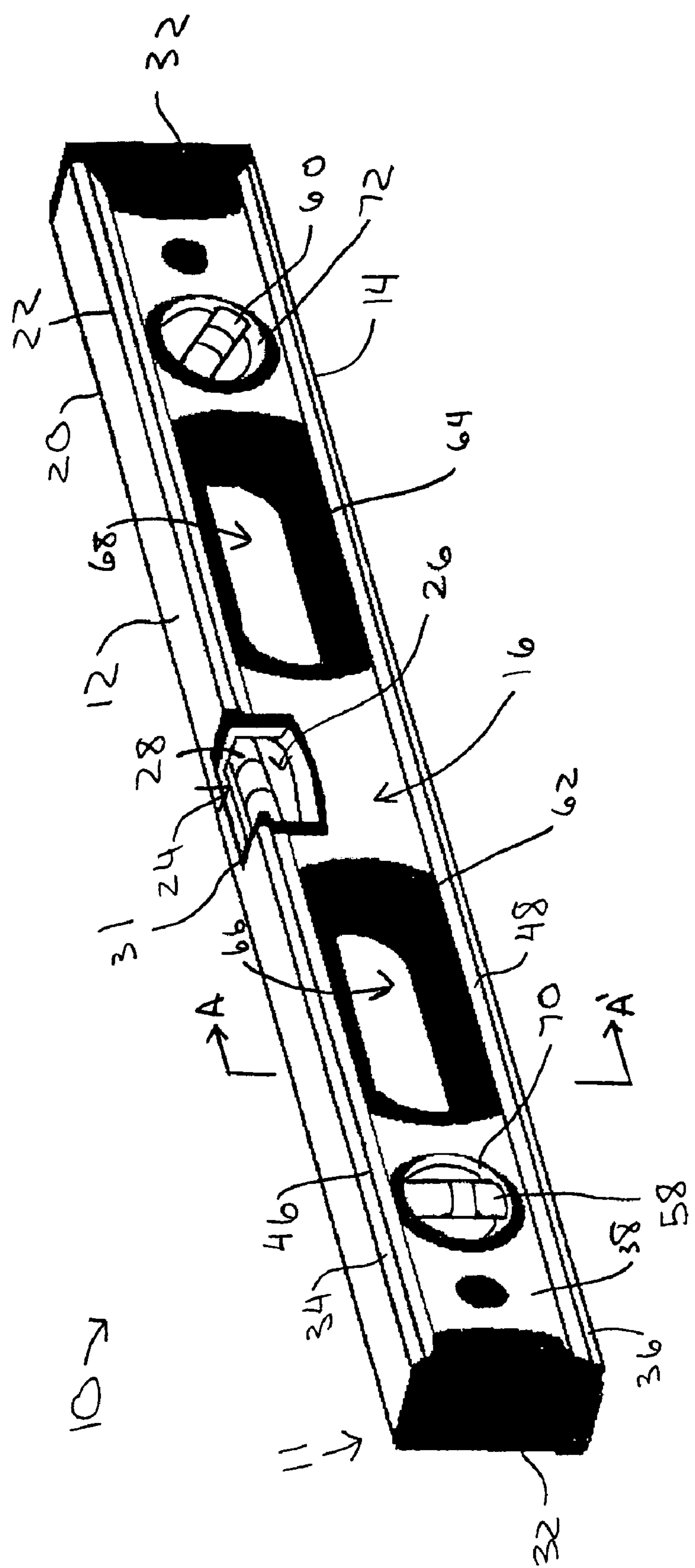
FIG. 1 is a schematic perspective view of a side of a level in accordance with an embodiment of the present invention.

The present invention will be described with reference to the accompanying drawings. Corresponding reference characters indicate corresponding parts throughout the several views. The description as set out herein illustrates an arrangement of the invention and is not to be construed as limiting the scope of the disclosure in any manner.

DETAILED DESCRIPTION OF THE INVENTION

As shown in FIGS. 1-5, a level 10 having a body 11 with an uninterrupted marking edge 20 is provided that allows for visibility of a bubble vial 28 from the top and side of the level 10. The linear edge 20 of the level body is configured to fully extend longitudinally from end to end of the level such that a user may use that entire edge to mark a surface. Another edge 22 of the level body is interrupted by openings in an upper wall 12 and a first side wall 16 to allow multi-directional visibility of a bubble vial 28 used for leveling purposes.

Figure 2:
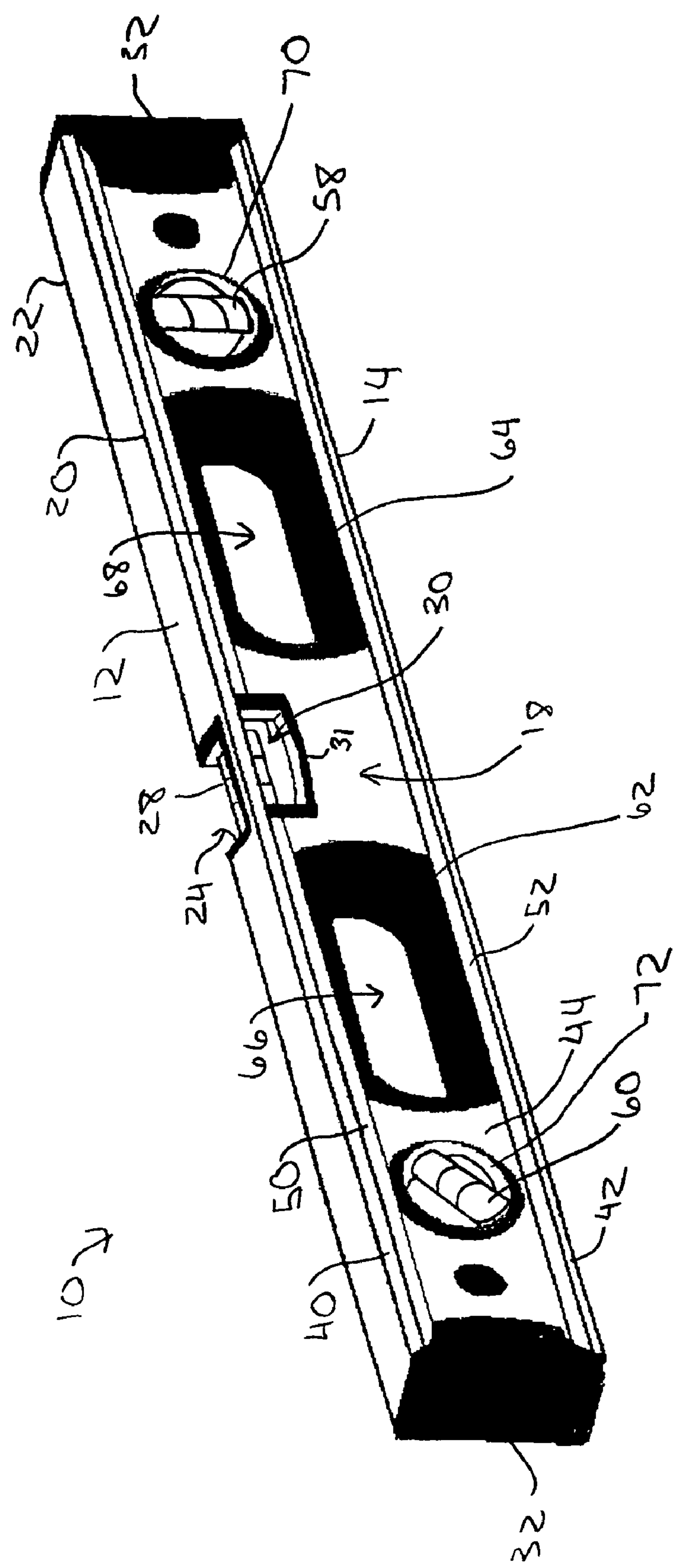
FIG. 2 is a schematic perspective view of another side of a level in accordance with an embodiment of the present invention.

The general layout of a level 10 in accordance with the present invention is shown in FIGS. 1 and 2. The level 10 has an elongated body 11 that comprises an upper wall 12 and a lower wall 14 that is generally parallel to the upper wall 12. A first side wall 16 is generally perpendicular to the upper 12 and lower 14 walls, and a second side wall 18 (see FIG. 2) is also generally perpendicular to the upper 12 and lower 14 walls. The sidewalls 16 and 18 are spaced from one another and generally parallel to one another. Each of the walls 12, 14, 16, and 18 extend longitudinally from end to end of the body 11 of the level 10. End caps 32 may be secured at the ends of the body 11 for protection against impact and/or ease of use. The end caps 32 may be made of rubber, plastic, elastomer or any other suitable material. The level body 11 may be made of metal, plastic, wood, or any other relatively hard material suitable for maintaining its form. In one embodiment, the body 11 is formed from extruded steel or aluminum.

The level body 10 may further comprise aligned, elongated openings 66, 68 in each of the side walls 16, 18. The openings 66, 68 may receive hand grip members 62, 64 in order to facilitate carrying of the level 10. The hand grip members 62, 64 may be made of rubber, plastic, elastomer or any other suitable material.

In one embodiment, the level 10 can be formed in accordance with the teachings of U.S. Pat. No. 6,675,490, hereby incorporated by reference, except that it will be substantially improved by incorporation of a top opening 24 contiguous with a side opening, and an uninterrupted straight edge 20, as will be described.

Figure 4:
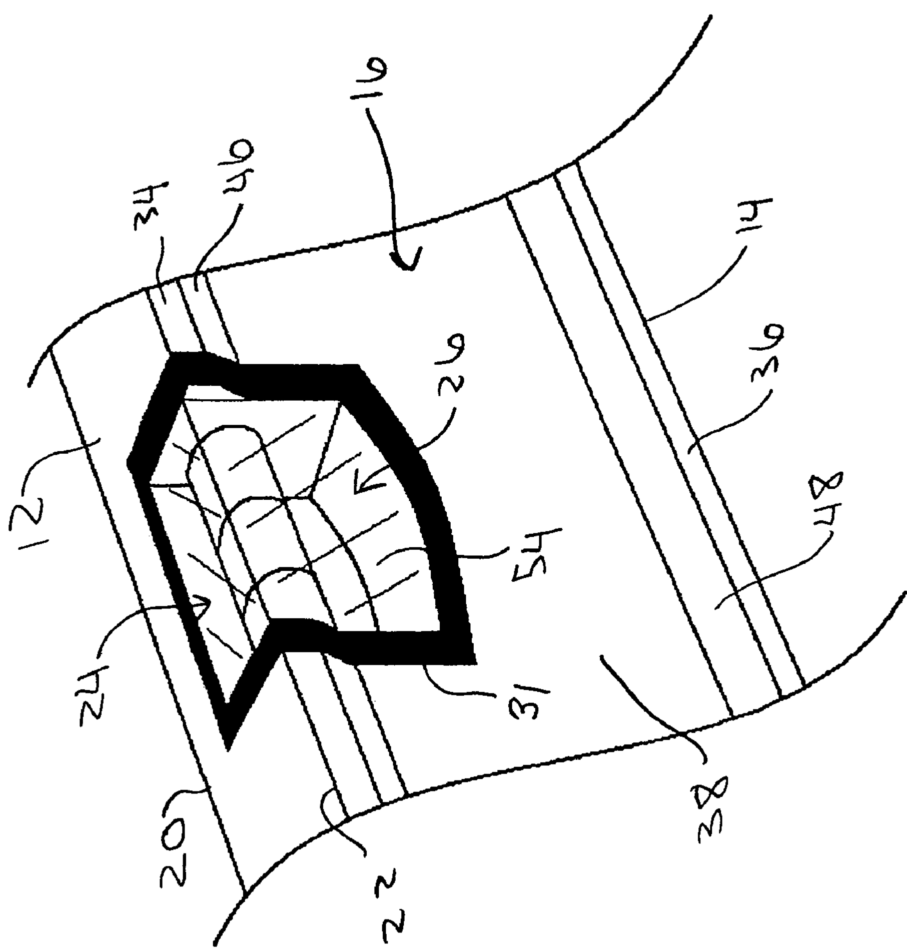
FIG. 4 is a schematic detail view of an opening having a window in a level in accordance with another embodiment of the present invention.
Figure 5:
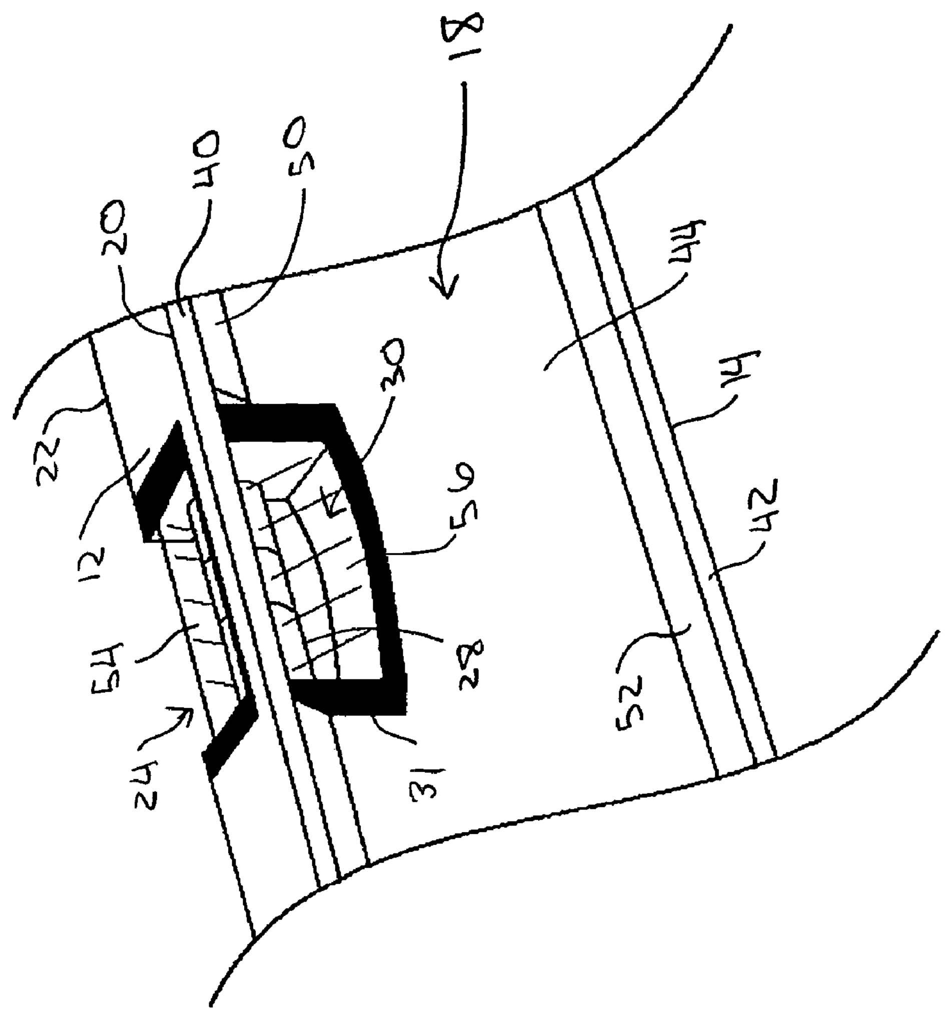
FIG. 5 is a schematic detail view of a further opening having a window in a level in accordance with another embodiment of the present invention.

As shown in FIGS. 1 and 4, the upper wall 12 has a top opening 24 therethrough at a generally central location, though it will be appreciated that the opening 24 may be at alternate locations along the upper wall 12. As shown, the upper wall 12 has a first linear edge 20 that extends uninterruptedly from end to end of the body 11, while a second linear edge 22 is interrupted at the opening 24. As best seen in FIGS. 2 and 5, the first linear edge 20 is disposed at an operative connection of the upper wall 12 and the second side wall 18. As best seen in FIGS. 1 and 4, the second linear edge 22 is disposed at the operative connection between the upper wall 12 and the first side wall 16.

As shown, the first side wall 16 may have a side opening 26 that is contiguous with the top opening 24 in the upper wall 12. A bubble vial 28 is carried by the body 11 and installed in a cavity formed by the openings 24, 26 such that it may be used for leveling purposes. The bubble vial 28 may therefore be visible from a first direction, through the top opening 24 in the upper wall 24, and from a second direction orthogonal to the first, through the side opening 26 in the first side wall 16. In this manner, a level 10 is described that has an uninterrupted marking surface (edge 20) and a bubble vial 28 that is visible from at least two orthogonal directions.

In addition, because the top opening 24 is contiguous with side opening 26, the bubble vial 28 can be viewed from a wide range of angles, without disruption. That is, the bubble vial 28 can be viewed through the top of the vial body (i.e., through top opening 24), and continuously through angles extending to the side opening 26 and beyond, so that the vial can be viewed at angles along an arc of at least 120° without any intervening opaque structure, such as an edge surface of the body.

As shown in FIGS. 2 and 5, the utility of the level 10 may be further increased by providing a second side opening 30 through the second side wall 18 in addition to the top opening 24 in the upper wall 12 and the first side opening 26 in the first side wall 16, described above. The opening 30 in the second side wall 18 allows the bubble vial 28 to be visible from a third direction that is orthogonal to the first direction and opposite to the second direction, described above.

For protective purposes, the openings 24 and 26 may by sealed by transparent or translucent windows 54 and 55, respectively, made of acrylic, glass, plastic, or other transparent or translucent material. On the opposite side, the opening 30 in the second side wall 18 may be provided with a similar window 56. In one embodiment, the bubble vial 28 comprises a barrel shaped opening formed in a solid rectangular block of clear plastic material, wherein a top surface of the block forms the top window 54, a first side surface of the block (which is perpendicular to the top surface of the block) forms the first side window 55, and a second side surface of the block (which is also perpendicular to the top surface of the block and parallel to the first side surface of the block) forms the second side window 56. In a different embodiment, the bubble vial 28 may have a rounded top surface (a cylindrical upper portion and rectangular block lower portion) in accordance with the teachings of U.S. patent application Ser. No. 11/435,723, filed May 28, 2006, hereby incorporated by reference.

In one embodiment, the top surface of the bubble vial 28 forming top window 54 is planar and positioned to be co-planar with the upper wall 12 of the body 11. In one embodiment, the side surface of the bubble vial 28 forming side window 55 is positioned to be co-planar with the first side wall 16.

In another embodiment, as shown in FIG. 2, surfaces forming the window(s) 54 and/or 55 are recessed from the associated upper wall 12 and/or the first side wall 16.

In one embodiment, a plastic or elastomeric protective member or molding 31 is formed along the cut-out edges of the body 11 that define the openings 24, 26, and 30, as seen best in FIGS. 4 and 5. The molding 31 provides softened, aesthetic edges to the areas surrounding the openings.

Figure 3:
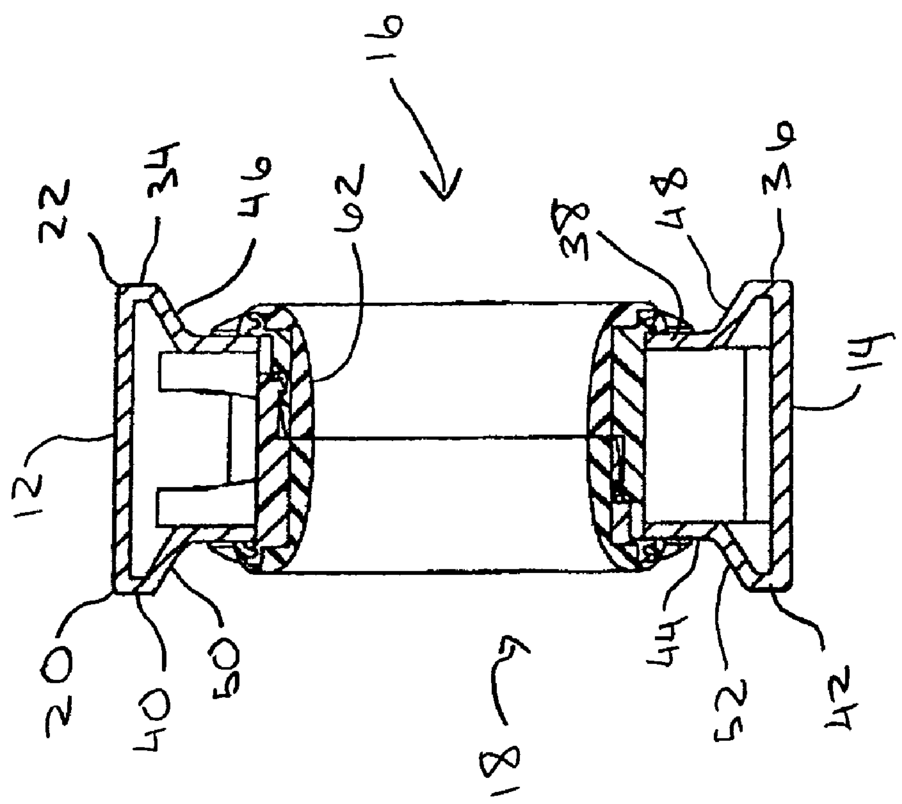
FIG. 3 is a schematic cross-sectional view of a level taken along line A-A' in FIG. 1 in accordance with an embodiment of the present invention.

FIG. 3 is a cross-sectional view of the level body 10 taken along line A-A' in FIG. 1. As shown, the level 10 may have a generally I-shaped box-beam type structure of the type described in the aforementioned U.S. Pat. No. 6,675,490. The first side wall 16 may have a first upper wall flange portion 34 that intersects with the upper wall 12, a first lower wall flange portion 36 that intersects with the lower wall 14, and a first main wall portion 38 extending between the first upper wall flange portion 34 and the first lower wall flange portion 36.

The second side wall 18 may similarly have a second upper wall flange portion 40 that intersects with the upper wall 12, a second lower wall flange portion 42 that intersects with the lower wall 14, and a second main wall portion 44 extending between the second upper wall flange portion 40 and the second lower wall flange portion 42.

As shown, the first main wall portion 38 is generally parallel to the second main wall portion 44. One of skill in the art will appreciate that the present invention is not limited to each of the main wall portions 38, 44 being parallel to each other. For example, the main wall portions 38, 44 may form a V-shaped cross-section with the distance between them being smaller at a region closer to the lower wall 14 than the distance between them at a region closer to the upper wall 12, or the main wall portions 38, 44 may form an inverted V-shaped cross-section. Moreover, the main wall portions 38, 44 may be curved or irregularly shaped such that any desirable cross-section may be achieved, such as a concave, convex, or ribbed configuration.

As shown in FIG. 3, the first upper wall flange portion 34 is generally parallel to the second upper wall flange portion 40, and the first lower wall flange portion 36 is generally parallel to the second lower wall flange portion 42. One of ordinary skill in the art will appreciate that variations on the orientations of the wall flange portions may be made within the scope of the present invention.

The first side wall 16 may further comprise a first upper angled wall portion 46 and a first lower angled wall portion 48. The first upper angled wall portion 46 connects the first main wall portion 38 with the first upper wall flange portion 34 and the first lower angled wall portion 48 connects the first main wall portion 38 with the first lower wall flange portion 36. The second side wall 18 may likewise comprise a second upper angled wall portion 50 and a second lower angled wall portion 52. The second upper angled wall portion 50 connects the second main wall portion 44 with the second upper wall flange portion 40 and the second lower angled wall portion 52 connects the second main wall portion 44 with the second lower wall flange portion 42.

As shown in FIGS. 1 and 4, the opening 26 in the first side wall 16 may extend through a portion of the first upper wall flange portion 34, a portion of the first upper angled wall portion 46, and a portion of the first main wall portion 38. As shown in FIGS. 2 and 5, the opening 30 in the second side wall 18 may extend through a portion of the second upper angled wall portion 50 and a portion of the second main wall portion 44. In an alternative embodiment, the opening 30 may additionally or alternatively extend through a portion of the second upper wall flange portion 40 or any one or more of the portions 40, 50, 44 of the second side wall 18.

In one embodiment, the first 46 and second 50 upper angled wall portions and the first 48 and second 52 lower angled wall portions for angles of 90 degrees with respect to the first 38 and second 44 main wall portions. One skilled in the art will appreciate that the angled wall portions 46, 50, 48, 52 may form an angle with respect to the main wall portions 38, 44 in the range of greater than about 0 degrees to less than about 180 degrees.

In one embodiment, the level body 11 has a more traditional "box-beam" shape.

As shown in the Figures, the bubble vial 28 has a fixed, calibrated orientation with respect to the lower wall 14. In the embodiments shown, the bubble vial 28 is oriented such that its longitudinal axis is substantially parallel to the lower wall 14. Accordingly, the lower wall 14 may be placed upon a horizontal surface and the bubble vial 28 may be referred to in order to determine whether the surface is level. The bubble vial 28 may also have a fixed, calibrated orientation with respect to the top wall 12, so that the top wall 12 can be placed on a horizontal surface and the bubble vial 28 may be referred to in order to determine if the surface is level.

In the event that a plumb determination capability is desired, a further bubble vial 58, that has a longitudinal axis perpendicular to the lower wall 14, may be provided at another location within or on the body 11 of the level 10. For that purpose, an opening 70 through each of the main walls 38, 44 may be provided. Accordingly, the lower wall 14 or upper wall 12 may be placed against a vertical surface, and the bubble vial 58 may be referred to in order to determine whether the vertical surface is plumb.

A further bubble vial 60 may be provided at another location within or on the level body 10, such as within an opening 72 through each of the main walls 38, 44, in order to determine whether a surface is oriented at 45 degrees. For this purpose, the bubble vial 60 may have a fixed orientation at 45 degrees with respect to the lower wall 14 and/or upper wall 12, so that such a determination may be made by placing the upper 12 or lower 14 wall against the surface being tested.

It can be appreciated that the linear straight edge 20 extends the entire length of the body 11, uninterrupted by any opening or other structure. The edge 20 can thus be used throughout its length as a good marking structure, to enable uninterrupted, smooth marking of surfaces with a marking implement, such as a pencil. A user may manually move or run the marking tip of the marking implement along the edge 20 in abutting contact therewith during a marking operation. At the same time, the openings 24, 26, and 30 provide visibility to the vial 28 from three sides (top and two opposite sides) of the level.

One of ordinary skill in the art will appreciate that a bubble vial of any angular orientation with respect to the lower wall 14 may be installed in a level 10 in accordance with the present invention without departing from its scope. Moreover, a bubble vial may be provided that has a variable orientation such that a user may orient the vial at an angle suitable for a particular application and later change its angle as the situation requires.

While specific embodiments have been described above, it will be appreciated that the invention may be practiced otherwise than as described. The descriptions above are intended to be illustrative and not limiting. Thus it will be apparent to one skilled in the art that modifications may be made to the invention as described without departing from the scope of the claims set out below.

What is claimed is:

1. A level, comprising:

a body comprising (a) upper and lower parallel walls, and (b) first and second side walls operatively connected with the upper and lower walls, the upper wall having first and second linear edges extending longitudinally along opposite sides of said upper wall;

the upper wall having an opening therethrough, the first of the side walls having an opening therethrough, the opening in the upper wall and the opening in the first side wall being contiguous with one another;

the second of the side walls having an opening therethrough;

wherein the first linear edge is disposed at the operative connection between the upper wall and the second wall, the first linear edge extending uninterruptedly from end to end of the body; and a bubble vial disposed in the body and visible from a first direction through the opening in the upper wall, visible from a second direction through the opening in the first side wall, and visible from a third direction through the opening in the second side wall, wherein the second direction is orthogonal to the first direction, and the third direction is orthogonal to the first direction.

2. The level of claim 1, further comprising end caps at opposite ends of the body.

3. The level of claim 1, wherein the first side wall comprises a first upper wall flange portion that intersects with the upper wall, a first lower wall flange portion that intersects with the lower wall , and a first main wall portion that extends between the first lower wall flange portion and the first upper wall flange portion.

4. The level of claim 3, wherein the second side wall comprises a second upper wall flange portion that intersects with the top wall, a second lower wall flange portion that intersects with the lower wall, and a second main wall portion that extends between the second lower wall flange portion and the second upper wall flange portion.

5. The level of claim 4, wherein the first main wall portion is parallel to the second main wall portion.

6. The level of claim 5, wherein the first upper wall flange portion is parallel to the second upper flange portion and co-planar with the first lower wall flange portion.

7. The level of claim 5, further comprising a pair of first angled wall portions that connect the first main wall portion with the first upper wall flange portion and the first lower wall flange portion.

8. The level of claim 7, further comprising a pair of second angled wall portions that connect the second main wall portion with the second upper wall flange portion and the second lower wall flange portion.

9. The level of claim 3, wherein the first side wall further comprises a first upper angled wall portion that connects the first upper wall flange portion with the first main wall portion, and a second lower angled wall portion that connects the first lower wall flange portion with the first main wall portion, and wherein the opening in the first side wall extends through a portion of the first upper wall flange portion, a portion of the first upper angled wall portion, and a portion of the first main wall portion.

10. The level of claim 9, further comprising a window that covers the opening in the top wall and the first side wall.

11. The level of claim 1, further comprising a transparent window covering the opening in the upper wall and the opening in the first side wall.

12. The level of claim 1, further comprising a first transparent window covering the opening in the upper wall and the opening in the first side wall, and a second transparent window covering the opening in the second side wall.

13. The level of claim 1, wherein the bubble vial has a fixed orientation relative to the lower wall.

14. The level of claim 13, wherein the fixed orientation of the bubble vial is such that a longitudinal axis of the bubble vial is substantially parallel to the lower wall.

15. The level of claim 14, further comprising another bubble vial having a fixed orientation such that its longitudinal axis is substantially perpendicular to the lower wall.

16. The level of claim 15, further comprising an angled bubble vial having a fixed orientation such that it is disposed at a 45 degree angle with respect to the lower wall.

17. The level of claim 1, further comprising aligned, elongated openings in the first and second side walls, said aligned elongated openings receiving a hand grip member to facilitate carrying of the level.

18. The level according to claim 1, wherein the bubble vial can be viewed continuously along an arc of at least 120 degrees without any intervening opaque structure.

19. A level, comprising:

upper and lower parallel walls;

a web comprising a pair of spaced apart side walls and connecting the upper and lower walls;

the upper wall having first and second linear edges extending longitudinally along opposite sides of the upper wall;

the first linear edge extending uninterruptedly from end to end of the body;

the top surface having a top opening therethrough, the top opening providing a discontinuity in the second linear edge;

the web having a side opening therethrough the side opening extending through both sidewalls;

a bubble vial carried by the level and being visible through the top opening and the side opening.

* * * * *